United States Patent
Alvarez et al.

(10) Patent No.: US 10,125,671 B2
(45) Date of Patent: Nov. 13, 2018

(54) WASTEGATE FOR AN ENGINE SYSTEM

(71) Applicant: Ford Global Technologies, LLC, Dearborn, MI (US)

(72) Inventors: Gilbran D. Alvarez, Dearborn, MI (US); Keith D. Miazgowicz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 15/347,669

(22) Filed: Nov. 9, 2016

(65) Prior Publication Data

US 2018/0128161 A1    May 10, 2018

(51) Int. Cl.
| | | |
|---|---|---|
| *F02B 37/18* | (2006.01) | |
| *F01N 3/20* | (2006.01) | |
| *F16K 1/20* | (2006.01) | |

(52) U.S. Cl.
CPC .......... *F02B 37/183* (2013.01); *F01N 3/2006* (2013.01); *F16K 1/2014* (2013.01)

(58) Field of Classification Search
CPC .... F02B 37/183; F02B 37/025; F16K 1/2014; F01N 3/2006; F02D 23/00
See application file for complete search history.

(56) References Cited

U.S. PATENT DOCUMENTS

| | | | |
|---|---|---|---|
| 7,562,528 B2 | 7/2009 | Wood | |
| 8,449,250 B2 | 5/2013 | Anschel et al. | |
| 9,021,802 B2 | 5/2015 | Petitjean et al. | |
| 2010/0221107 A1* | 9/2010 | Anschel | F02B 37/00 415/206 |
| 2011/0005222 A1* | 1/2011 | Hayashi | F02B 37/183 60/602 |
| 2011/0173974 A1* | 7/2011 | Grabowska | F01D 17/105 60/602 |
| 2015/0345375 A1* | 12/2015 | Grabowska | F02B 37/183 415/148 |
| 2016/0341109 A1* | 11/2016 | Lummer | F02B 37/025 |

FOREIGN PATENT DOCUMENTS

| | | |
|---|---|---|
| DE | 3735736 A1 | 5/1989 |
| DE | 102012218137 A1 | 6/2014 |

* cited by examiner

*Primary Examiner* — Patrick Maines
(74) *Attorney, Agent, or Firm* — Julia Voutyras; McCoy Russell LLP

(57) ABSTRACT

Methods and systems are provided for a wastegate of a turbocharger including a valve plate, valve actuation mechanism, and a wastegate passage. In one example design, the wastegate may include a valve plate having flow formations such as a multiplane curved surface on an interior of the valve plate and a side opening; a passage including a constricted section positioned upstream of the valve plate, the valve plate positioned at an end of the passage. In this way, the flow formations on the wastegate valve may act in conjunction with the constricted section in the passage to guide exhaust flow to an exhaust catalyst.

19 Claims, 11 Drawing Sheets

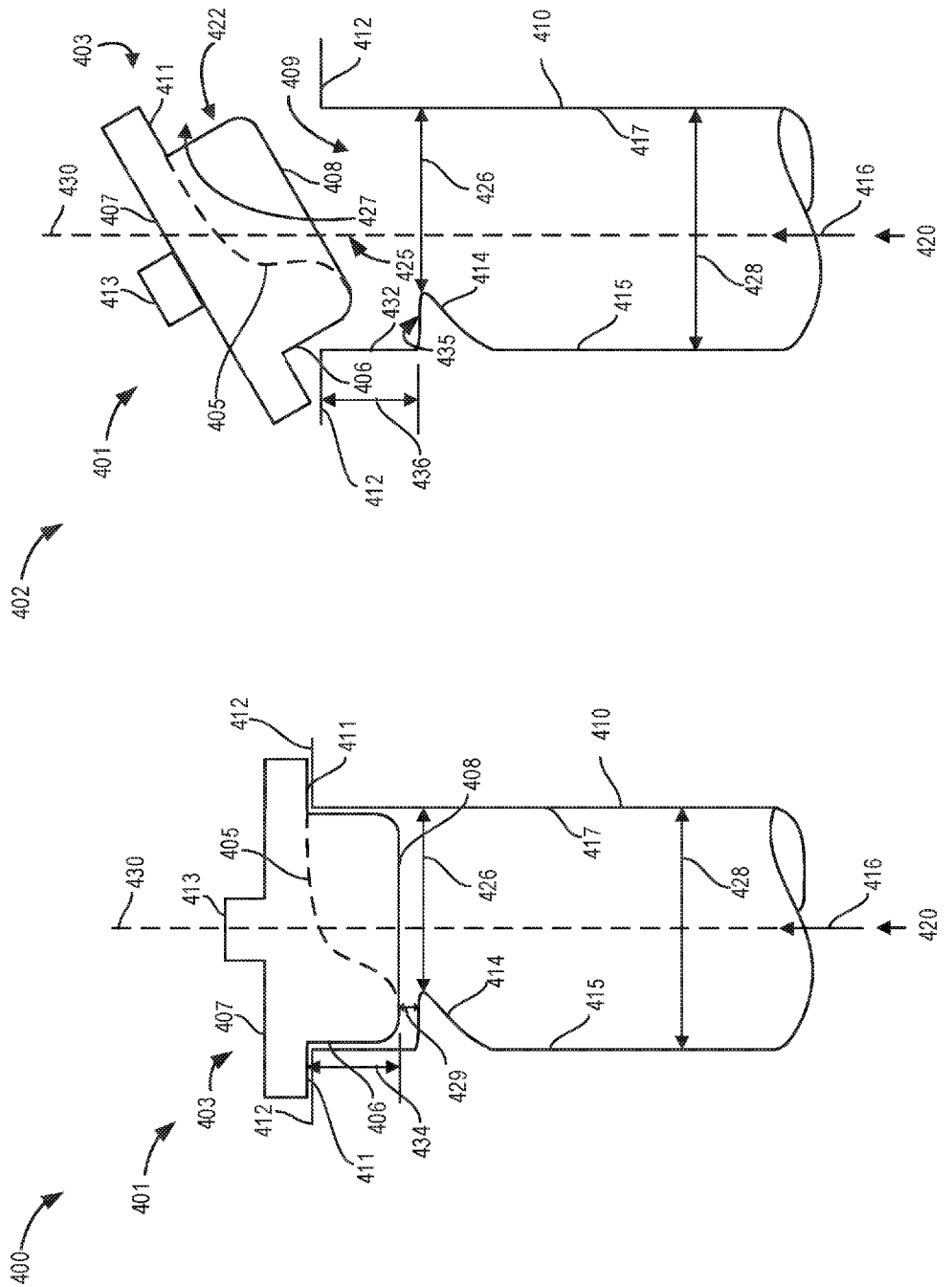

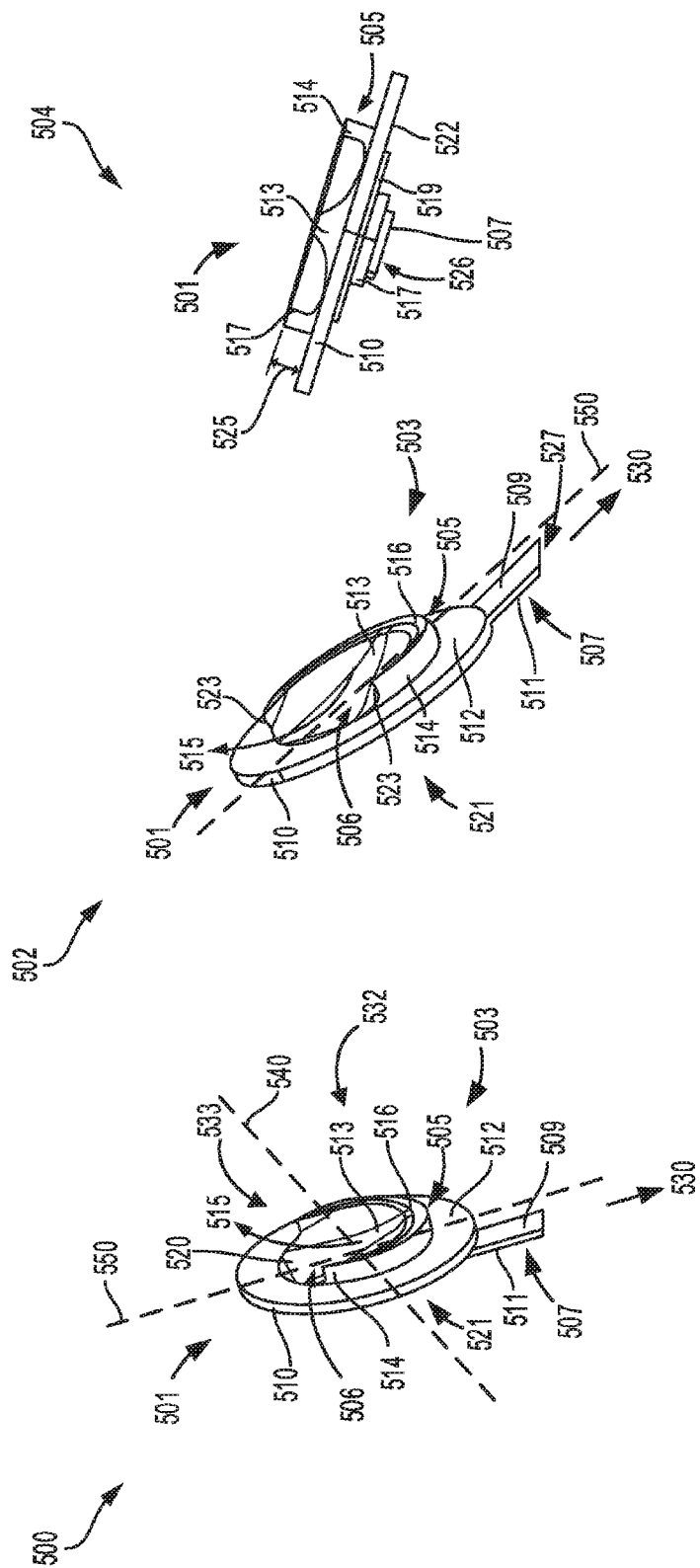

WASTEGATE FOR AN ENGINE SYSTEM

FIELD

The disclosure relates to methods and systems of a wastegate mounted to an exhaust passage of a turbocharger to direct exhaust flow to an exhaust catalyst.

BACKGROUND AND SUMMARY

Exhaust flow in a turbocharger system may be partially directed to an exhaust driven turbine to drive a compressor that delivers air into engine cylinders, while the remaining portion of the exhaust gas may be flowed via a bypass passage around the turbine to an exhaust catalyst placed downstream of the turbine. The bypass passage may include a wastegate valve that may be adjusted into an open position, thereby allowing exhaust gases to bypass the turbine and flow to the catalyst. The wastegate valve may be adjusted into a closed position that at least partially blocks exhaust flow in the bypass passage and thus most of the exhaust gas delivered from the engine is directed to the turbine. During an engine cold start, exhaust gas may be at least partially routed through the bypass passage and wastegate in order to direct exhaust flow to a front face of the catalyst, thereby enabling catalyst light off to be reached more quickly.

One example design of a wastegate valve in an exhaust passage of a turbocharger is disclosed by Grabowska in U.S. patent application 2015/0345375. Therein, a wastegate valve assembly having flow formations is provided to direct exhaust gas in a primary flow direction while reducing exhaust losses in secondary flow directions. Specifically, the wastegate includes flow formations on a valve body, supported on a valve arm that is pivotally supported on a turbine housing. Example flow formations on the valve body include a concave shaped disc, shallow ribs and an extended semi-circular surface formed on the valve body to direct exhaust flow in the primary direction.

The inventors herein have recognized potential issues with the example approach disclosed above. For example, in the valve body configured with the concave shape disc or shallow ribs, exhaust flow may fan out in multiple directions, impinging on turbocharger walls and creating turbulent flow conditions. As a result, exhaust energy may be transmitted to the turbocharger walls leading to reduced flow efficiency and energy losses. Also, since the flow fans out in multiple directions before flowing downstream, less exhaust heat may reach the catalyst and thus delayed catalyst lightoff may occur.

The inventors herein have developed a wastegate design to at least partly address the above issues. In one example design, a wastegate may be provided comprising: a valve plate including a multiplane curved surface on an interior of the valve plate, the curved surface forming a raised edge on a first side of the valve plate and a side opening on a second side of the valve plate; a passage including a constricted section positioned upstream of the valve plate and aligned with the raised edge, the valve plate positioned at an end of the passage.

In this way, the design of the wastegate may be used to improve flow efficiency and reduce energy losses in the turbocharger while improving catalyst lightoff. For example, the multiplane curved surface on the valve plate may act in conjunction with the constricted section in the passage to guide exhaust flow and increase flow velocity downstream of the wastegate. In this way, the wastegate design may confer several advantages. By directing exhaust flow downstream instead of fanning out in multiple directions, the wastegate may reduce exhaust energy losses to turbocharger walls. Further, the constricted section in the passage may allow the exhaust flow to speed up before exiting the wastegate. In this way, the wastegate valve may reduce exhaust energy losses to improve catalyst lightoff conditions while reducing fuel emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A shows a first view of a second embodiment of a wastegate valve in a closed wastegate position and having a passage with a constricted section formed on an internal wall of the passage.

FIG. 4B shows the second embodiment of the wastegate valve in an open position.

FIG. 5A shows a first view of a valve plate of a third embodiment of a wastegate valve.

FIG. 5B shows a second view of the valve plate of the third embodiment of the wastegate valve.

FIG. 5C shows a third view of the valve plate of the third embodiment of the wastegate valve.

FIGS. 2-9B are shown to scale, although other relative dimensions may be used, if desired.

DETAILED DESCRIPTION

Figure 1:
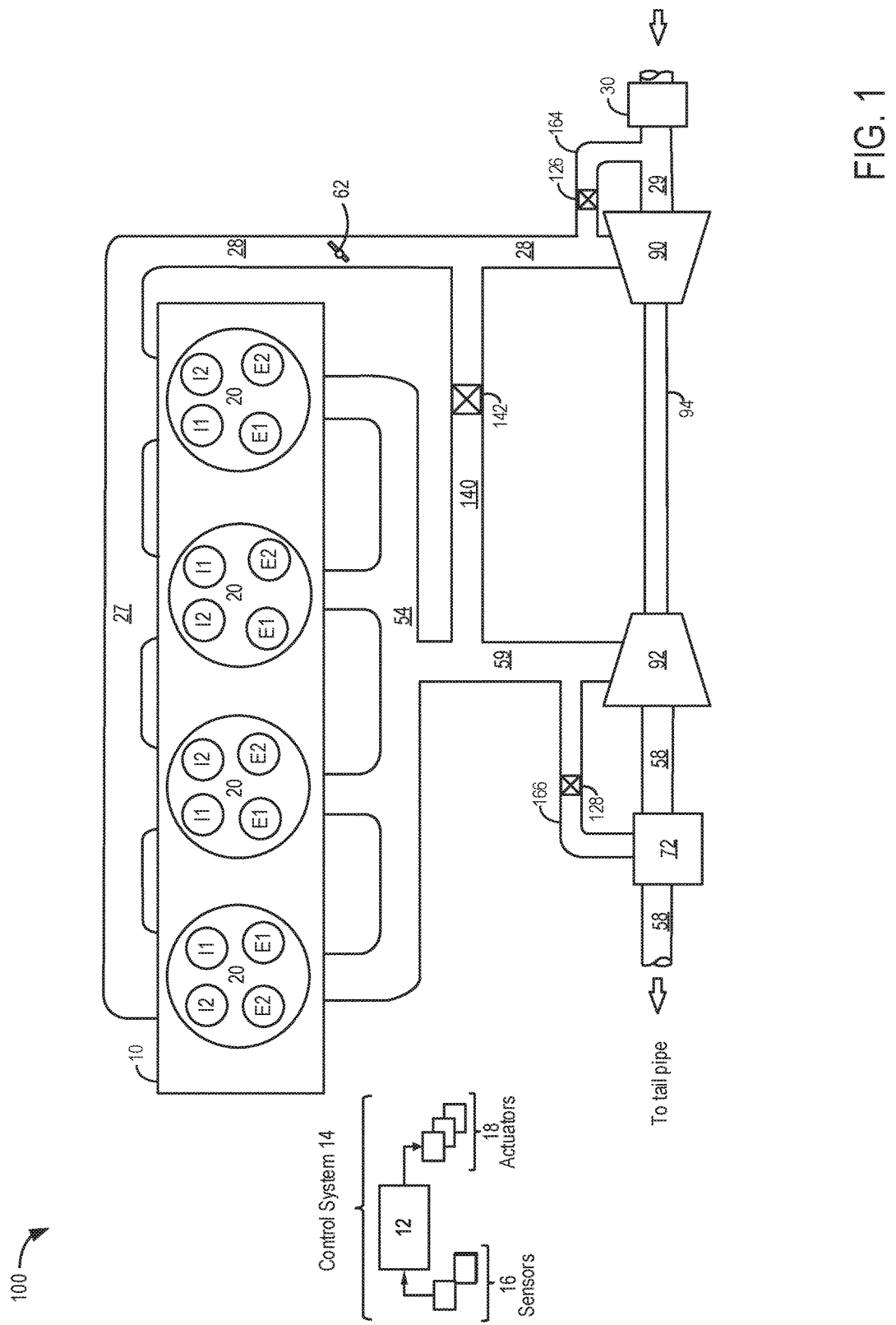
FIG. 1 shows a schematic depiction of an engine system including a turbocharger system with an exhaust bypass passage configured with a wastegate valve.
Figure 2:
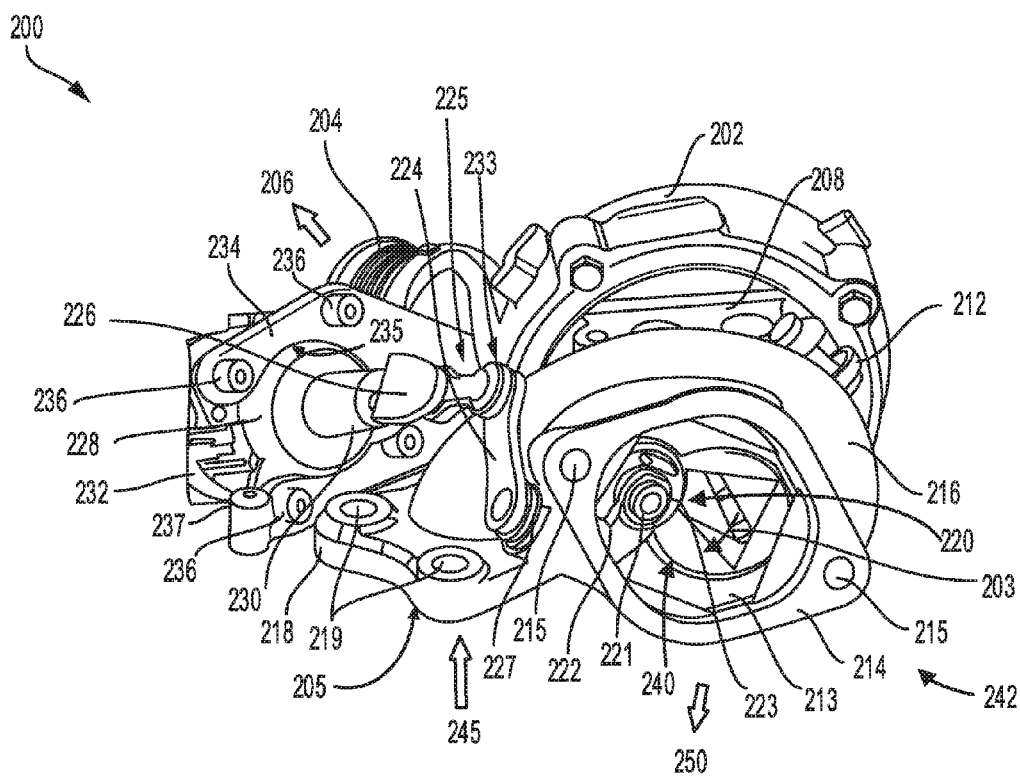
FIG. 2 shows an example turbocharger comprising an exhaust bypass passage having a wastegate valve.
Figure 3:
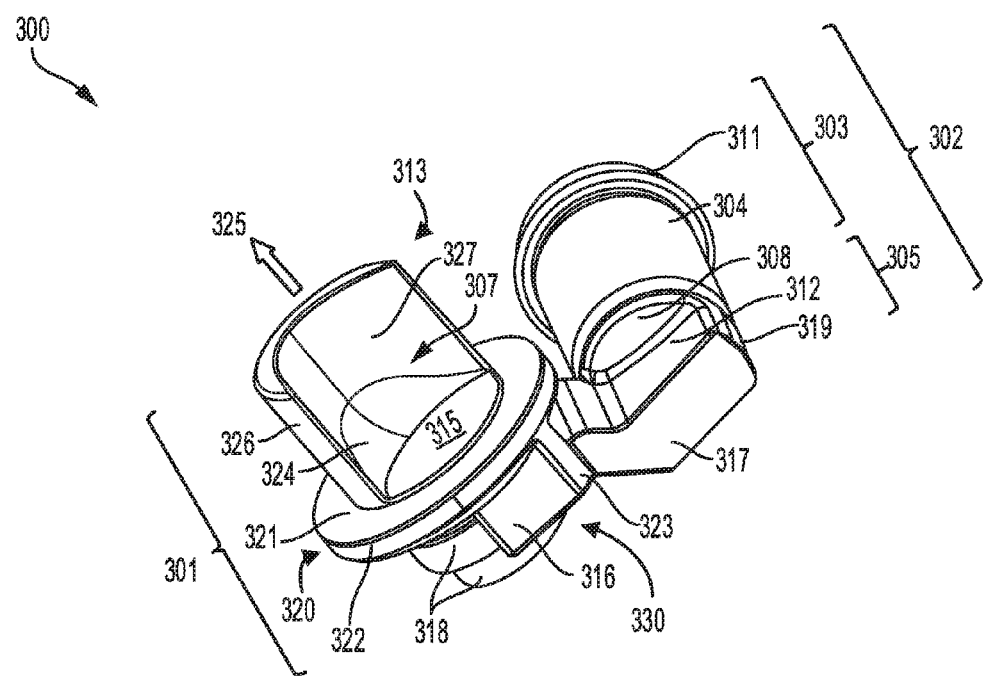
FIG. 3 shows a schematic depiction of a first embodiment of a wastegate including a wastegate valve with a valve plate actuator.
Figure 4C:
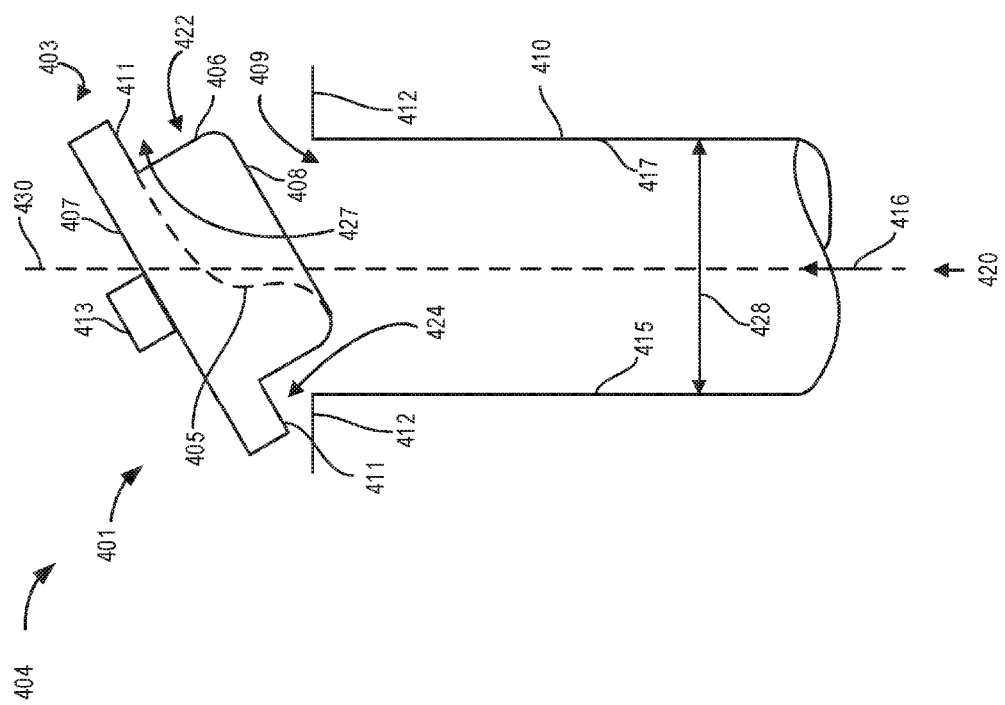
FIG. 4C shows an alternative embodiment of a wastegate valve in an open position and having a passage with no constricted section formed on an internal wall of the passage.
Figure 6A:
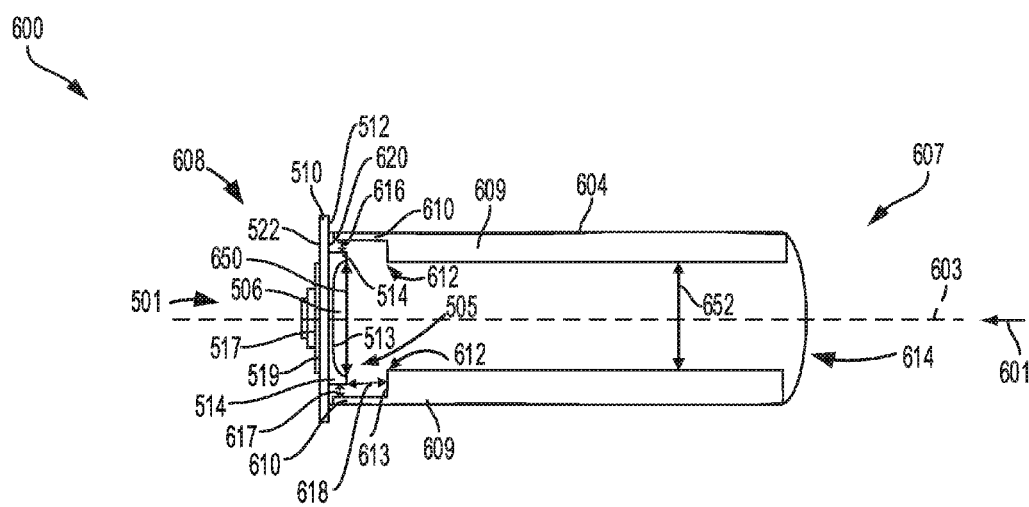
FIG. 6A shows a first view of the third embodiment of the wastegate valve in a closed position.
Figure 6B:
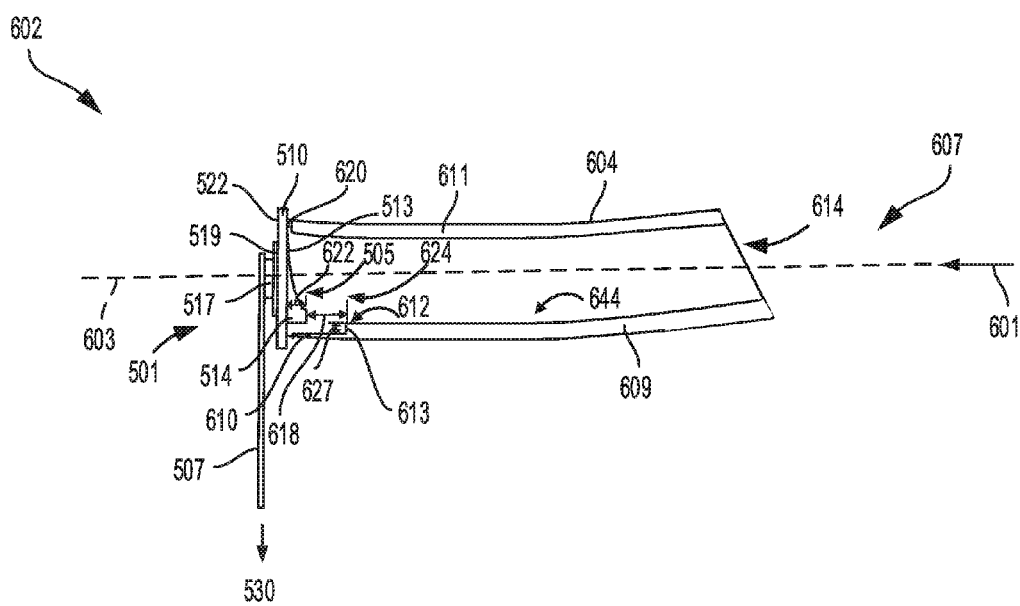
FIG. 6B shows a second view of the third embodiment of the wastegate valve in the closed position.
Figure 6C:
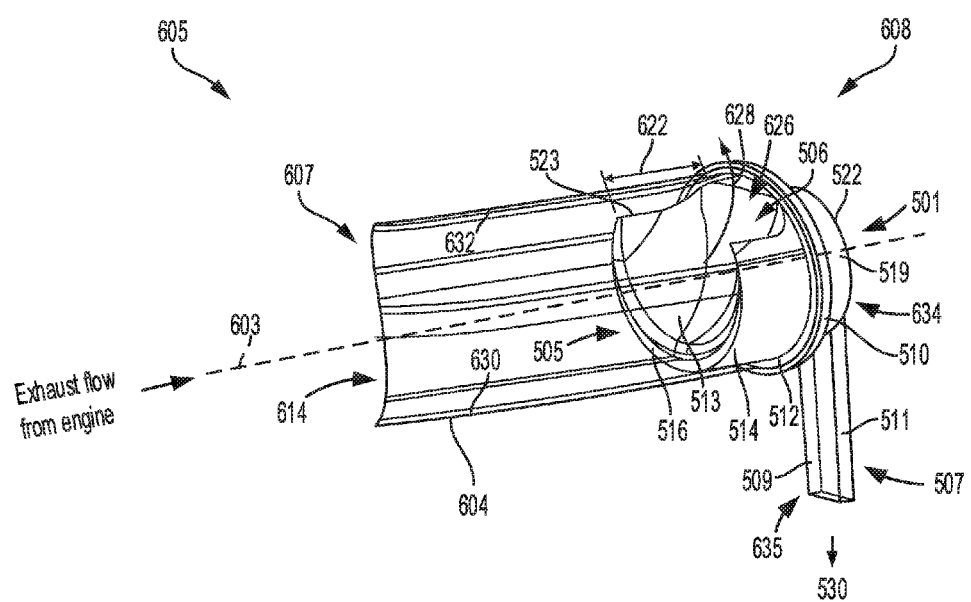
FIG. 6C shows a fourth embodiment of the wastegate valve in the closed position.
Figure 7A:
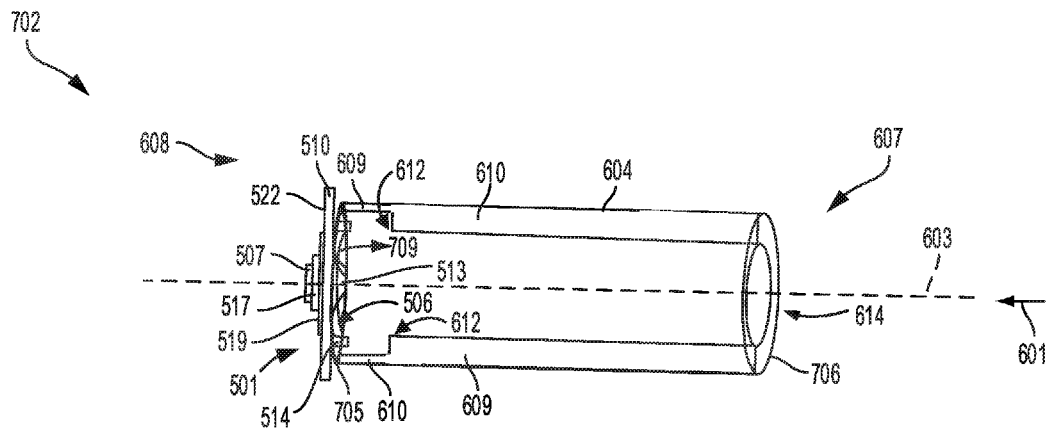
FIG. 7A shows a first view of the third embodiment of the wastegate valve in a partially open position.
Figure 7B:
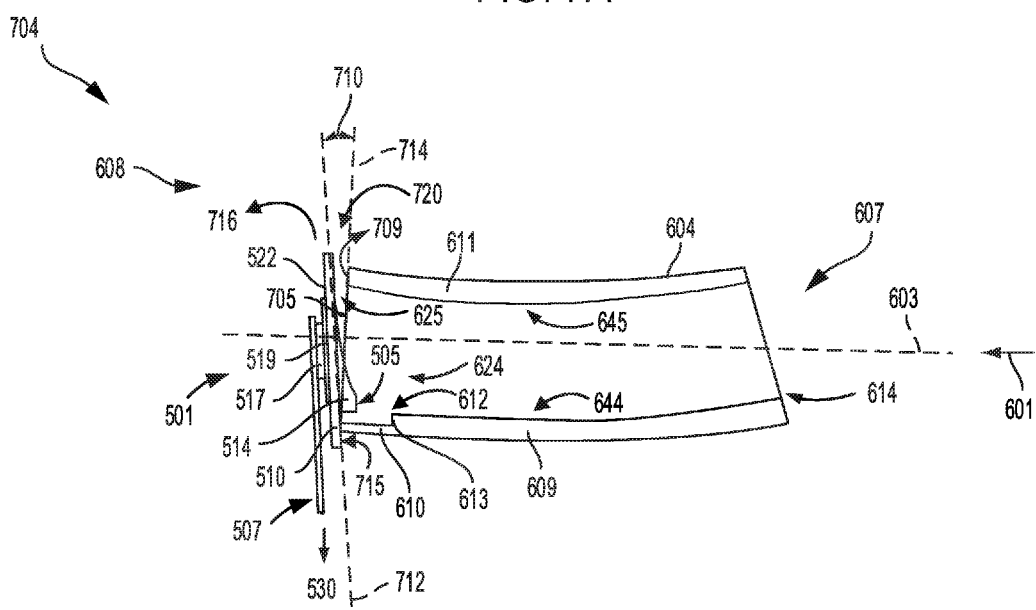
FIG. 7B shows a second view of the third embodiment of the wastegate valve in the partially open position.
Figure 8A:
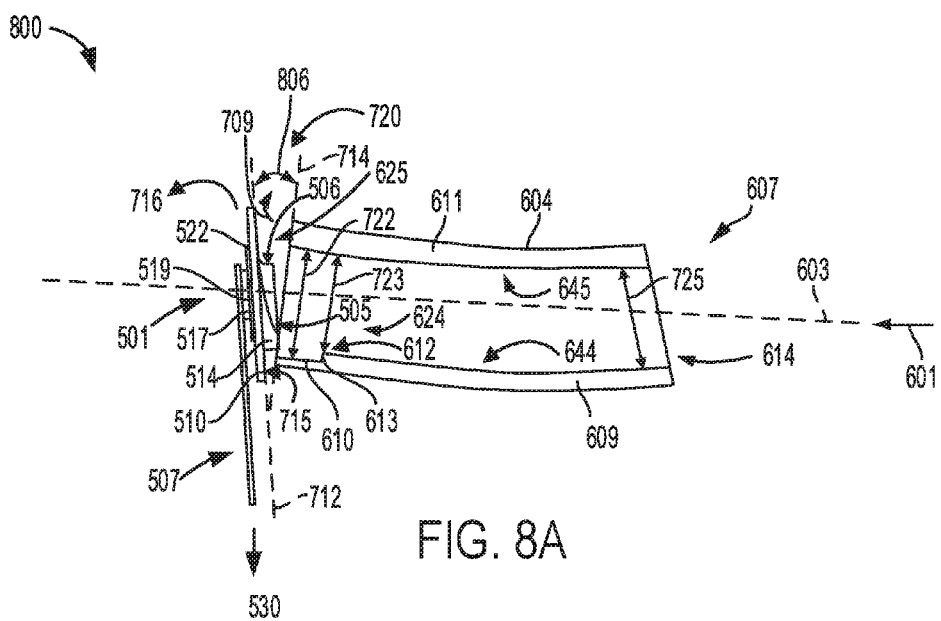
FIG. 8A shows a first view of the third embodiment of the wastegate valve in a fully open position.
Figure 8B:
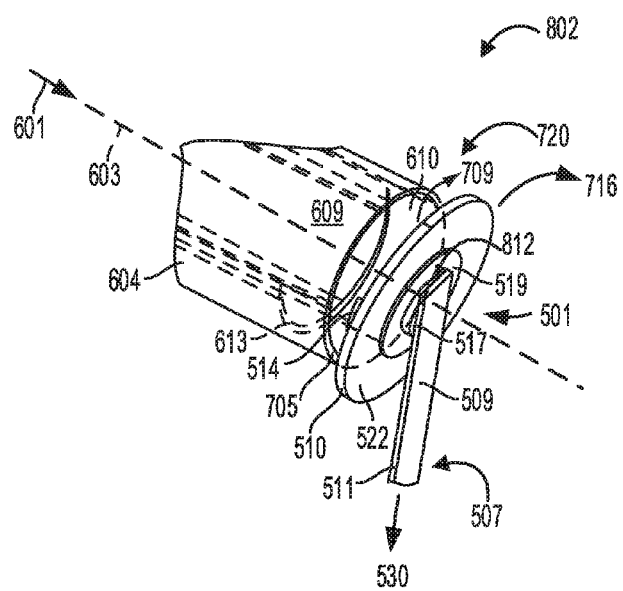
FIG. 8B shows a second view of the third embodiment of the wastegate valve in the fully open position.
Figure 9A:
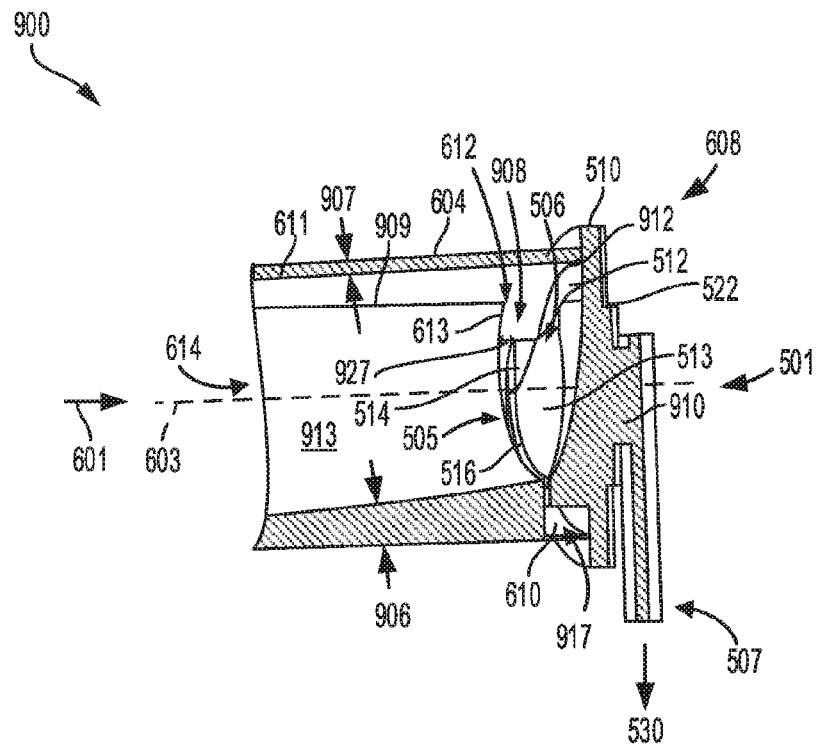
FIG. 9A shows a first cross sectional view of the third embodiment of the wastegate valve in a closed position.
Figure 9B:
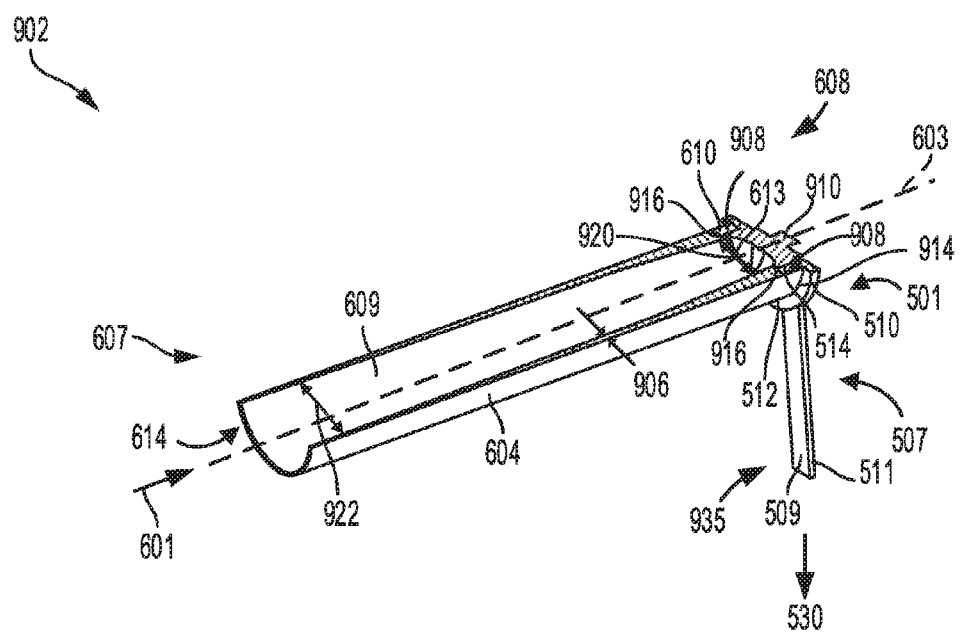
FIG. 9B shows a second cross sectional view of the third embodiment of the wastegate valve in the closed position.

The following description relates to a turbocharger system with an exhaust bypass passage configured with a wastegate valve to control exhaust flow around a turbine and to an exhaust catalyst placed downstream of the turbine in an engine, as shown in FIG. 1. As depicted in FIG. 2, an example engine turbocharger having a wastegate valve including a valve actuation mechanism to control exhaust flow within a bypass passage around the turbine and to the exhaust catalyst is disclosed. The wastegate valve may be adjusted to open or close by the actuator mechanism using various means including mechanical, hydraulic, electrical, and other suitable actuation methods. FIG. 3 shows a schematic view of a first embodiment of the wastegate including a valve plate and a valve plate actuator. The wastegate also includes a passage with a curved interior surface that may act to direct exhaust flow delivered from engine cylinders (via the exhaust passage) to the exhaust catalyst. FIG. 4A shows a first view of a second embodiment of the wastegate valve in a closed wastegate position and having a passage having a constricted section formed on an internal wall of the passage. The wastegate valve may be adjusted into an open position to allow exhaust flow through an outlet of the wastegate, as shown in FIG. 4B. An alternative embodiment of the wastegate valve in an open position and having a passage with no constricted section formed on an internal wall of the passage is depicted in FIG. 4C. In this case, the exhaust gas may flow in multiple directions, as shown. The exhaust flow fanning out of the wastegate outlet, may impinge on walls of the exhaust passage downstream of the valve and cause turbulent flow conditions, which may lead to exhaust energy loss. FIGS. 5A-5C show schematic views of a valve plate of a third embodiment of the wastegate valve. FIGS. 5A-5B show a first and second view, respectively of the valve plate of the third embodiment of the wastegate valve. FIG. 5C shows a third view of the valve plate of the third embodiment of the wastegate valve. FIGS. 6A-6B show schematic views of the third embodiment of the wastegate valve in a closed position. FIG. 6A shows a first view of the closed wastegate valve. FIG. 6B shows a second view of the wastegate valve in the closed position. In each of the first and second views in FIGS. 6A-6B, the wastegate valve having features similar to the valve plate disclosed with reference to FIGS. 5A-5C is disclosed. FIG. 6C shows a schematic view of a fourth embodiment of the wastegate valve in the closed position. FIGS. 7A-7B show schematic views of the third embodiment of the wastegate valve in a partially open position. FIG. 7A shows a first view of the wastegate valve in the partially open position. FIG. 7B shows a second view of the wastegate valve in the partially open position. In each of the first and second view of FIGS. 7A-7B, the wastegate valve is partially open to allow exhaust flow in a flow direction toward an exhaust catalyst placed downstream of the wastegate. FIGS. 8A-8B show a first and second view of the wastegate valve in a fully open position. When fully open, exhaust flow through the wastegate outlet may increase and thus reduce a catalyst warm up duration. FIGS. 9A-9B show a first and second cross sectional views of the third embodiment of the wastegate valve in a closed position. A raised edge formed on an internal surface of the wastegate valve may act in conjunction with a constricted section formed on an internal wall of a passage of the wastegate, to guide exhaust flow to the exhaust catalyst via the valve outlet. In this way, the wastegate valve and passage may act to expedite catalyst lightoff while minimizing fuel emissions.

FIGS. 2-9B show example configurations with relative positioning of the various components of the wastegate valve and exhaust passage. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, a schematic diagram of a vehicle system 100 including an engine 10 having a turbocharger is shown. Engine 10 may include a plurality of combustion chambers (i.e., cylinders). The engine 10 may include a plurality of cylinders 20, arranged in an inline four configuration. It should be understood, however, that though FIG. 1 shows four cylinders, engine 10 may include any number of cylinders. For example, engine 10 may include any suitable number of cylinders, e.g., 2, 3, 4, 5, 6, or more cylinders in any configuration, e.g., V-6, I-6, V-12, opposed 4, etc.

Each cylinder 20 of engine 10 may receive intake air from an intake manifold 27 via an air intake passage 28 which may include an air intake throttle 62. The position of throttle 62 can be adjusted by a control system 14 via a throttle actuator (not shown) communicatively coupled to controller 12 which is connected to sensors 16 and actuators 18. By modulating throttle 62, an amount of fresh air may be inducted from the atmosphere via intake passage 29 and delivered through an air filter 30, and compressed by compressor 90 before being delivered to the engine cylinders. As mentioned above, the intake manifold 27 may communicate with one or more cylinders of engine 10. In some embodiments, one or more of the intake passages may include a turbocharger having a compressor 90 driven an exhaust turbine 92 via coupled a shaft 94. Specifically, blades of the turbine 92 may be driven by a portion of the exhaust gas stream or flow discharged from engine 10, causing the shaft 94 to rotate and thereby driving the compressor. As an example, the compressor 90 may be coupled to the turbine 92 such that the compressor 90 may be actuated when the blades of the turbine 92 rotate at a predetermined speed. When actuated, the compressor 90 may draw air from the atmosphere via intake passage 29, and then direct pressurized air to intake passage 28 where it may then be directed to engine 10. The speed of the turbine 92 may be inferred from one or more engine operating conditions. Alternatively, the compressed air may be diverted via bypass passage 164 configured with a control valve 126 and connected to intake passages 28 and 29 to avoid compressor surge during steady state operation and transients.

Intake manifold 27 may be coupled to the cylinders 20 via intake ports (not shown). Each intake port may supply air and/or fuel to the respective cylinder for combustion. Each cylinder intake port may selectively communicate with the cylinder via one or more intake valves. In the depicted example, each cylinder 20 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each cylinder 20 may exhaust combustion gases via an exhaust port (not shown) coupled thereto. Each respective exhaust port may direct exhaust combustion gases from a respective cylinder to an exhaust manifold 54. For example, each cylinder exhaust port may selectively communicate with the cylinder via exhaust valves E1 and E2. In some examples, each cylinder may include two or more exhaust valves. The exhaust manifold 54 is fluidly coupled to an exhaust passage 59, allowing exhaust gas flow to the turbine 92. As an example, the exhaust gas exhausted from cylinders 20 flows to exhaust manifold 54, where the exhaust is further conveyed to the turbine via exhaust passage 59. In one example, the exhaust gas delivered to the turbine cause rotation of turbine blade, driving the compressor 90 via shaft 94. Further, exhaust passage 59 may be coupled to an exhaust gas recirculation (EGR) passage 140 having a control valve 142, and connected to the intake passage 28. The valve 142 controls an amount of exhaust gas recirculated to the intake passage 28 via the recirculation passage 140.

Further, a wastegate (e.g., wastegate valve) 128 may be included in a bypass 166 coupled between an inlet (or upstream of the inlet) and downstream of an outlet of the exhaust driven turbine to control an amount of exhaust gas delivered to the turbine and an exhaust catalyst 72 mounted downstream of the turbine. When the wastegate 128 is closed, most or all of the exhaust gas from engine 10 is delivered to the turbine and then to the exhaust catalyst. The wastegate 128 may be fully opened to divert exhaust gas around turbine 92 and to a front face of the exhaust catalyst 72, especially during cold engine starts, thereby allowing for expedited catalyst warmup. As an example, the wastegate 128 and bypass passage 166 may include flow formations to direct exhaust flow downstream to the exhaust catalyst. In one example, the flow formations may include a constricted section formed in a passage of wastegate 128, located upstream of a valve plate of wastegate 128, where the wastegate passage forms part of and is directly coupled to the bypass passage 166. In another example, the waste gate 128 may include a valve plate configured with a semi-circular raised edge that extends into the wastegate passage, and a side opening that directs exhaust flow downstream in bypass passage 166 while reducing a tendency of the exhaust gas to impinge on passage walls. When open, the wastegate 128 may act to direct exhaust flow downstream to the catalyst 72 while minimize exhaust energy losses due to exhaust gas impinging on walls of the bypass passage 166.

Details on the wastegate 128 and bypass passage 166 are disclosed further below with reference to FIGS. 3-9C.

Exhaust gases exiting the bypass passage 166 and turbine 92 may pass through the catalyst 72, which may include multiple catalyst bricks, in one example. In another example, multiple catalysts, each with multiple bricks, may be used. In some examples, catalyst 72 may be a three-way type catalyst. In other examples, catalyst 72 may include one or a plurality of a diesel oxidation catalyst (DOC), and a selective catalytic reduction catalyst (SCR). After passing through catalyst 72, exhaust gas may be directed out to a tailpipe 58.

In this way, the system of FIG. 1 may comprise: a turbocharger including a bypass passage arranged around the turbine of the turbocharger; a catalyst positioned downstream of the turbine and the bypass passage; a wastegate positioned within the bypass passage, the wastegate comprising: a wastegate passage coupled within the bypass passage, the wastegate passage including a constricted section and a lip formed downstream of the constricted section, at an end of the wastegate passage; a valve plate positioned at the end of the wastegate passage, downstream of the lip, the valve plate including a multiplane curved surface on an interior of the valve plate, the curved surface forming a raised edge on a first side of the valve plate and a side opening on a second side of the valve plate, where the constricted section is aligned on a same side of the wastegate passage as the first side of the valve plate. By providing the multiplane curved surface in the wastegate valve plate and constricted section in the wastegate passage, exhaust flow may be directed downstream in the bypass passage to the exhaust catalyst, without impinging on sidewalls of the bypass passage to minimize exhaust energy losses while expediting catalyst lightoff.

Referring to FIG. 2, a three dimensional view of an example turbocharger 200 of an internal combustion engine (such as engine 10 shown in FIG. 1), which may be included in a propulsion system of an automobile is disclosed. The turbocharger 200 includes a compressor housing 202, a center housing 208 coupled to the compressor housing, and a turbine housing 216 having a main opening 240. The compressor housing 202 may contain a compressor that compresses and delivers air to the engine via an airflow duct 204, as shown by arrow 206. A bypass passage (not shown) configured with a wastegate valve 220, may be fluidly coupled to the main opening 240 when the wastegate valve 220 is adjusted to an open position.

As shown in FIG. 2, exhaust flow from the engine may enter the turbine housing 216 via a passage 205, as shown by arrow 245. The passage 205 may be coupled to an exhaust manifold (such as exhaust passage 59 of FIG. 1) connected to a plurality of engine cylinders (such as cylinders 20 of FIG. 2), to allow exhaust gas from the engine to enter the turbine. A plurality of slots 219 formed on an inlet flange 218 attached to a base region of the turbine housing 216, may receive bolts or suitable fasteners to securely attach the turbine housing 216 to the exhaust manifold connected to the engine. At its upstream end, the turbine housing 216 may be connected to the compressor housing 202 via the center housing 208. In this example, the turbine housing 216 is mounted to the center housing 208 by a V-band clamp assemble 212. The outlet 203 in the center housing 208 leads into the main opening 240 having interior walls 213 of the turbine housing 216. A flange 214 formed on an outlet end 242 of the turbine housing 216, may be coupled to an exhaust duct to convey the exhaust gas from the main opening 240 to an exhaust catalyst (e.g., catalyst 72 of FIG. 1) placed downstream of the duct. The flange 214 may be securely fastened to the exhaust duct using bolts or suitable fasteners inserted into slots 215 formed on the flange, such that the main opening 240 is fluidly coupled to the exhaust duct. In this case, exhaust flow from the turbine housing 216 may be conveyed through the main opening 240, where the exhaust gas is further flowed downstream to the exhaust catalyst, for example.

Exhaust flow delivered from the engine to the turbine housing 216 enters the turbine through the passage 205 on the inlet flange 218 and the bypass passage (not shown) as shown by the arrow 245. The wastegate 220 mounted to the bypass passage (not shown), may be provided to control exhaust flow from the bypass passage into the main opening 240, where the exhaust gas is further conveyed to the exhaust catalyst in flow direction 250. The wastegate 220 may include an extendable arm 222, secured on one end to a valve plate 223 of the wastegate 220, and coupled on another end to a first arm 224 of a valve actuation mechanism 225 at a joint location 227. As an example, the extendable arm 222 may be an L shaped arm extended to connect with the first arm 224 which is coupled to a second arm 226 at an extensible joint 233.

The valve actuation mechanism 225 may be coupled to a plunger mechanism 228 by securely fastening a distal end of the second arm 226 to an annular tube 230 of the plunger. As shown, the plunger mechanism 228 is mounted in an aperture 235 formed by an integral bracket 234 attached to the compressor housing 202, and having a plurality of cylindrical elements 236 and an annular cylinder 237. As an example, the cylindrical elements 236 and annular cylinder 237 may provide additional structural integrity to the integrated bracket 234. The plunger mechanism 228 is coupled to an electric motor 232 that may provide electrical power to operate the valve actuation mechanism 225. As an example, the valve actuator is controlled to open the wastegate to allow excess air to bypass the turbine to create required power to increase a compressor boost pressure for a given engine operating condition. In other examples, the valve actuation mechanism 225 may be mechanically, hydraulically or electrically controlled to open and close the wastegate valve during engine operation. In further examples, a combination of mechanical, hydraulic and electrical methods may be applied to actuate the wastegate valve during engine operation.

The wastegate valve may be actuated to fully open in the direction 250 of the exhaust flow, allowing exhaust gas from the engine to be delivered into the main opening 240 via turbine passage 205, where the exhaust is further flowed to the exhaust catalyst. The wastegate valve may be configured with flow formations such as a curved internal wall and a side opening in the valve plate 223 that may act in conjunction with a constricted section in the wastegate passage to more directly guide exhaust flow to the exhaust catalyst and not sidewalls of the main opening 240 of the turbine housing 216. In this way, the wastegate valve may reduce exhaust energy losses due to exhaust gas impinging on walls of the main opening 240 of the turbine housing 216. As a result, catalyst lightoff may be expedited during engine operation while minimizing fuel emissions. Details of the curved internal wall on the wastegate valve and constricted section in the wastegate passage are further disclosed below with reference to FIGS. 3-9B.

Turning to FIG. 3, a schematic view 300 of a first embodiment of a wastegate valve 301 and a valve actuation mechanism 302 is shown. The wastegate valve 301 includes a valve plate 320 including a raised edge 326, side opening 307, and stepped annular cylinders 318. The valve actuation mechanism 302 includes an annular arm 303 connected to a transition arm 305.

As shown, the raised edge 326 on the valve plate 320, may be formed on a top circular surface 321 having a side surface 322 and a downward extending portion 323 connected to the stepped annular cylinders 318. As an example, the raised edge 326 may be formed on the top circular surface 321 and partially surrounding the inner wall 315. The raised edge 326 may be configured with a multiplane curved surface 324 forming a portion of an interior wall 327, and a side opening 307 to direct exhaust flow in a first direction 325, when the wastegate is open, for example. The stepped annular cylinders 318 may include a first and second annular cylinder coupled to a side portion 316 of the transition arm 305; the side portion abutting one or more surfaces of the stepped cylinders 318 and a downward extending portion 323.

The annular arm 303 has a larger diameter at its distal end 311, which tapers off into a uniform cylindrical portion 304 coupled to a transition arm 305 having a top surface 312, front surface 317 and side surface 319. As an example, a first end of the transition arm 305 may be centrally coupled the annular arm 303, with front surface 308 merging into the top surface 312 of the transition arm 305. A second end of the transition arm 305 may be coupled to a bottom portion 330 of the wastegate valve 301, below the valve plate 320. The bottom portion 330 of the valve plate 320 includes stepped annular cylinders 318 connected to each other, and connected to a portion of the transition arm 305.

The wastegate valve 301 may be mounted to a wastegate passage (not shown) to control exhaust flow from the passage to an exhaust catalyst placed downstream of the wastegate. When in an open wastegate position, exhaust flow through the wastegate passage may be directed out of the passage via the side opening 307 in a second direction, towards the exhaust catalyst. For example, flow formations on the wastegate valve 301 which include the multiplane curved surface 324 and the side opening 307 may act in conjunction with one another to direct the exhaust flow downstream to the exhaust catalyst, while minimizing exhaust energy losses due to exhaust flow impinging on walls of the wastegate passage. Although not shown, the wastegate passage may also be configured with a constricted section upstream of the wastegate valve, to guide exhaust flow to the exhaust catalyst downstream of the wastegate. Details on flow formations on the wastegate valve 301 and the constricted section in the wastegate passage are disclosed further below with reference to FIGS. 4A-4C. The wastegate valve 301, actuation mechanism 302 and wastegate passage may be comprised of stainless steel or cast iron, for example.

In this way, a multiplane curved surface and side opening may be provided on the wastegate valve to more directly convey the exhaust flow to the exhaust catalyst. As an example, the constricted section in the wastegate passage may act in conjunction with the curved surface on the valve plate to direct the exhaust flow downstream to the exhaust catalyst, thereby allowing expedited catalyst lightoff.

Turning to FIGS. 4A-4C, schematic views showing embodiments of a wastegate 401 including a valve plate 403 and wastegate passage 410 are disclosed. FIG. 4A shows a first view 400 of the wastegate passage 410 with a closed wastegate valve. The wastegate passage 410 includes a constricted section 414 formed on a first internal wall 415 of the passage. Further, the wastegate passage 410 may be configured with a first diameter 426 at the constricted section 414, and a second diameter 428, upstream of the constricted section 414, wherein the first diameter 426 may be smaller than the second dimeter 428. Further, a portion of the wastegate passage 410, downstream of the constricted section 414 and upstream of the valve plate 403, may have the second diameter 428. FIG. 4B shows a second view 402 of the wastegate passage 410, with the wastegate valve adjusted to an open position. In each of the first and second views, a second internal wall 417 of each wastegate passage has no constricted section. In this way, the constricted section 414 may only be on a single side of the wastegate passage 410, relative to a central axis 430 of the wastegate passage 410. The valve plate 403 and wastegate passage 410 may be included as a portion of a bypass passage around a turbine (e.g., such as bypass passage 166 disclosed above with reference to FIG. 1). An alternative embodiment 404 of the wastegate passage 410 with no constricted section formed on either the first internal wall 415 and second internal wall 417 of the passage, is shown in FIG. 4C.

The valve plate 403 may include an annular portion 413 formed on a top cylindrical portion 407, and a raised edge 406 configured to fit inside an outlet 409 of the wastegate passage. When closed, a base 408 of the raised edge sits adjacent to the constricted section 414 formed on the first internal wall 415 of the wastegate passage 410. The base 408 of the raised edge 406 may sit at a distance 429 from a lip edge 435 of the constriction section 414. When mounted inside the wastegate passage 410, the raised edge 406 of the valve plate 403 may be adjacent or in face-sharing contact with a lip surface 432 of the passage 410. The constricted section 414 formed in the wastegate passage 410, may be positioned upstream of the raised edge 406, for example. The lip surface 432 of the wastegate passage 410, may be a portion of the passage, downstream of the constricted section 414, that the raised edge 406 of the valve plate 403 sits within, in the closed position. As an example, the lip surface 432 of the wastegate passage 410 may have a length 436. In this case, the lip surface 432 in the wastegate passage 410, may extend from the wastegate outlet 409 to the lip edge 435. In other examples, the lip surface 432 is an internal wall of the wastegate passage 410 forming a lip, and the lip edge 435 is a portion of a wall that forms the constricted section 414.

A curved surface (e.g., multiplane curved surface) 405 on the valve plate 403, may form the raised edge 406 and a side opening 422 to direct exhaust flow in a first direction, as shown by arrow 427. As an example, the curved surface 405 may act in conjunction with the constricted section 414 in the passage 410 to guide exhaust flow directly to an exhaust catalyst downstream of the valve plate 403. The raised edge 406 of the valve plate 403 may have a length 434. In one example, the length 434 of the raised edge 406 may be selected to have a first length, based on position of the constricted section 414 on the first internal wall 415 of the wastegate passage 410. In other examples, the length 434 of the raised edge 406 may be selected to have a second length greater than the first length. In further examples, the length 434 of the raised edge 406, may be specific to a geometry of the wastegate passage 410, and an amount of flow turning needed to direct the exhaust flow towards a catalyst face.

Furthermore, the top cylindrical portion 407 of the valve plate 403, may have an extended surface 411 forming a lower portion of the top cylindrical portion that may be connected to the raised edge. When closed, extended surface 411 of the valve plate 403 may touch top (or be in face-sharing contact with) surfaces 412 at the outlet of the wastegate passage 410. As shown in FIG. 4B, exhaust gas flow from an engine may be diverted into the wastegate passage 410 as shown by direction 420 at a passage inlet 416. When the valve plate 403 is open, the exhaust gas flows through the wastegate passage 410, and may increase in flow velocity upon approaching the constricted section 414, before exiting the passage from the passage outlet 409, and flowing through the side opening 422 in the valve plate 403. As an example, the constricted section 414 may be only positioned on a first side of the wastegate passage and not on a second side of the passage, wherein the second side of the passage is opposite the first side of the passage relative to the central axis 430 of the passage. In another example, the constricted section 414, comprising an elevated circumferential surface may be positioned on the first internal wall 415 to constrict flow upstream of the valve plate 403. In one example, the distance 429 may be selected such that the constricted section 414 is positioned at a first distance from the base 408 of raised edge 406 of the valve plate 403. In other examples, the distance 429 may be selected to be a second distance, wherein the second distance is greater than the first distance. In further examples, the constricted section 414 may be selected to have a first diameter that is smaller than a second diameter of the wastegate passage to accelerate the flow in the wastegate passage when the wastegate is open. In one example, the first diameter may be a constricted section diameter, and the second diameter may be a passage diameter. The constricted section diameter may be selected to be less than the passage diameter in order to increase exhaust flow velocities at the passage outlet while minimizing turbulent flow conditions. Further, the constricted section diameter may be selected so that exhaust flow is directed toward a side of the wastegate that includes the curved surface 405 and side opening 422. As shown in FIGS. 4A-4B, the constricted section 414 may be angled inward towards the central axis 430 and then abruptly diverges back outward towards the first internal wall 415 of the wastegate passage 410. However, in alternate embodiments, the constricted section 414 may be more pronounced or angled gradually both inward and then back outward. As an example, the constricted section 414 may be configured with a circular or an oblongate shape having different angles or radii of curvature. As shown, the shape of the constricted section 414 provides a means of guiding exhaust flow towards the passage outlet 409, as shown by arrow 425. Further, the constricted section 414, may act in conjunction with the curved surface 405 on the valve plate to direct exhaust flow through the side opening 422, as shown the arrow 427.

In a case where no constricted section is formed on the first and second internal wall of the wastegate passage, a portion of the exhaust gas may flow downstream while a remaining portion of the exhaust gas may be diverted along direction 424, before being conveyed downstream as illustrated at FIG. 4C. When diverted along direction 424, the exhaust gas may impinge on passage walls (not shown) downstream of the wastegate, before flowing downstream to the exhaust catalyst. In this case, the exhaust gas may loss a significant quantity of energy (due to energy transferred to the passage walls via conduction) before reaching the exhaust catalyst, leading to delayed catalyst lightoff.

As shown in FIGS. 4A-4B, the constricted section 414 is formed on a first side of the wastegate passage 410 relative to the central axis 430. The raised edge 406 is formed on a first side of the valve plate 403, where the first sides of the valve plate 403 and wastegate passage 410 are aligned with one another. Further, the constricted section 414 curves inward toward the central axis 430 and the curved surface 405 curves inward toward the central axis 430, and a second side of the valve plate 403, in direction of exhaust flow through the wastegate passage 410). In this way, the constricted section 414 formed on the first internal wall 415 of the wastegate passage 410 may act in conjunction with the curved surface 405 on the wastegate valve plate 403 to guide exhaust flow downstream to the exhaust catalyst, thereby allowing expedited catalyst lightoff while reducing fuel emissions.

Turning to FIGS. 5A-5C, schematic views showing a third embodiment of a wastegate valve plate 501 are depicted. FIG. 5A shows a first view 500 of wastegate valve plate 501. FIG. 5B shows a second view 502 of the wastegate valve plate 501. The valve plate in the first and second views is shown with a front end 503 and a back end 521 visible. FIG. 5C shows a third view 504 of the wastegate valve plate 501 from a side of the valve plate 501.

As shown in FIGS. 5A-5C, the wastegate valve plate 501 includes an inner circular face 512 and a circular portion 510 formed circumferentially around an outer portion of the valve plate. The valve plate 501 may include a curved surface (e.g., multiplane curved surface) 513 forming a raised edge 505 on a first side 532 of the valve plate 501, and a side opening 506 on a second side 533 of the valve plate 501. When mounted to a wastegate passage (such as wastegate passage 410 shown in FIGS. 4A-4B) and the wastegate valve is in a closed position, the inner circular surface 512 and curved surface 513 on the valve plate 501 face an interior of the wastegate passage. The raised edge 505 may include a side wall 514 and curved edge 516. The side wall 514 arises (e.g., extends outward) from the inner circular face 512 to an outer edge of the raised edge 505. As an example, the raised edge 505 may have a length 525, similar to length 434 of the raised edge 406 shown in FIG. 4A. The curved surface 513 tapers gradually from the raised edge 505 to a deep portion 520 that forms part of the side opening 506. As an example, the raised edge 505 may be semicircular in shape, with the side opening 506 formed opposite the raised edge 505 to direct exhaust flow in a first direction, as shown by arrow 515. In another example, the raised edge 505 of the valve plate 501 may be provided in other suitable geometrical configurations. In other examples, the side opening 506 may be formed on the second side 533 of the valve plate opposite the first side 532 of the valve plate 501, which includes a majority of the raised edge 505. As an example, the majority of the raised edge 505 may be located below a first axis 540 of the valve plate, while a second axis 550 divides the valve plate into two symmetrical portions. The side opening 506 on the curved surface 513, may convey exhaust flow to an exhaust catalyst placed downstream of the valve plate 501. As an example, the side opening 506 may be sized to allow adequate exhaust flow through the valve outlet to expedite catalyst lightoff. The curved edge 516 may terminate at opposites ends of the raised edge 505 to form a curved section 523 which gradually tapers off into the side opening 506. The curved surface 513, curves in between the side walls 514 of the raised edge 505 in a plurality of directions, forming a multiplane curved surface that directs exhaust flow in the first direction, as shown by the arrow 515.

A valve arm 507, having a flat surface 509 and side edge 511, may be attached to a cylindrical element 517 formed on a circular element 519, mounted to a back surface 522 of the valve plate. As an example, a proximal portion 526 of the valve arm 507 may be attached to the valve plate 501 while a distal portion 527 of the valve arm 507 may be connected to an actuation mechanism (such as mechanism 225 shown in FIG. 2) in direction 530, to control opening and closing of the valve plate when mounted to a wastegate passage (such as wastegate passage 410 shown in FIGS. 4A-4B). In one example, the actuation mechanism controlling the valve plate may be operated using various methods including mechanical, hydraulic or electrical, although other suitable actuation methods may be employed. In this way, the valve plate may be adjusted to open using the actuation mechanism attached to the distal end of the plate, thereby directing exhaust flow from the wastegate passage to the catalyst placed downstream of the valve plate.

Turning to FIGS. 6A-6B, schematic views showing a third embodiment of a wastegate (e.g., wastegate valve) including the valve plate 501 and valve arm 507 of an actuation mechanism from FIGS. 5A-C, and a wastegate passage 604 are shown. FIG. 6A shows a first view 600 of the third embodiment of the wastegate valve in a closed position. FIG. 6B shows a second view 602 of the third embodiment of the wastegate valve in the closed position. In each of the first and second views, the valve plate 501 has similar features as those of the valve plate disclosed above with reference to FIGS. 5A-5C. The exhaust flow from an engine (shown by flow direction 601) enters a main opening 614 formed in an interior region of the wastegate passage at an upstream end 607 of the passage. The exhaust flow from the upstream end 607, may flow through the main opening 614 of the wastegate passage to a downstream end 608 of the wastegate.

The valve plate 501 may be mounted at the downstream end 608 of the wastegate passage 604. When the valve plate 501 is closed, an inner circular face 512 of the valve plate abuts against (e.g., is in face sharing contact with) an interior section 620 of the wastegate passage 604, and tightly seals the passage. In the closed wastegate position, raised edge 505 is disposed inside the main opening 614 at the downstream end 608 of the wastegate, with a side opening 506 formed on an opposite end of the raised edge, closed off by passage walls. As an example, a curved surface 513 forming the side opening 506, may direct exhaust flow via an outlet of the wastegate passage, when the valve plate 501 is adjusted to an open position, as disclosed further below with reference to FIGS. 7A-7B. In one example, the side opening 506 may have a diameter 650, adequately sized to expedite flow of exhaust through an outlet of the wastegate passage 604, when the valve plate 501 is adjusted to the open position. In other examples, the diameter 650 of the side opening 506 may be equal or larger than a diameter 652 of the wastegate passage 604. In further examples, the valve plate 501 may be adjusted to close, such that a base of the valve plate 501 covers an opening at the end of the passage and an interior side of the base sits against the end of the passage.

Further, the curved surface 513 forming the raised edge 505 and a side opening 506, may be configured with a sloping concave surface (as shown in FIGS. 5A-5C) to direct exhaust flow in a direction toward an exhaust catalyst when the valve plate 501 is adjusted into an open position. The curved surface 513, may be curved in between a side wall 514 in multiple directions, forming a multiplane curved surface that forms the side opening 506 and the raised edge 505. As an example, the curved surface 513, may curve towards the side opening 506, thereby directing exhaust flow towards the exhaust catalyst, as shown further below with reference to FIGS. 7A-7B.

As shown in FIG. 6A, a first clearance 616 and a second clearance 617 may be formed between the side wall 514 of the raised edge 505 and a lip edge 613 on a first internal wall 609 of the wastegate passage 604. Each of the first and second clearances may be sized to allow easy opening and closing of the valve plate 501 without rubbing against the internal walls of the wastegate passage. The raised edge 505 may be sized with a length 622 that minimizes turbulent exhaust flow conditions at the wastegate outlet. As depicted in FIG. 6B, the length 622 of the raised edge 505 may have a first length, based on a position of a constricted section 612, formed between the first internal wall 609 and a lip surface 610 of the wastegate passage and/or based on a desired angle of curvature of the curved surface 513 (e.g., the length 622 may increase to provide a large angle of curvature for the curved surface 513). In other examples, the length 622 of the raised edge 505, may be selected to have a second length, wherein the second length may be greater than the first length. In further examples, the length 622 may be specific to a geometry of the wastegate passage 604 and an amount of flow turning needed to direct the exhaust flow toward an exhaust catalyst.

The raised edge 505 may be positioned at a distance 618 from the constricted section 612, for example. In one example, the distance 618 may be decreased so that the raised edge 505 is in face sharing contact with or adjacent to an edge of the constricted section 612.

As shown in FIGS. 6A-6B, the constricted section 612 formed at the junction between the first internal wall 609 and the lip surface 610 of the wastegate passage. As an example, the constricted section 612 may be formed only on a first side 644 of the wastegate passage, relative to a central axis 603 of the passage, and the first side 644 is a same side as a first side 624 of the valve plate. The constricted section 612 has a height 627 that may be smaller than a threshold height. As an example, the threshold height may be a height of the constricted section that minimizes turbulent flow conditions at the passage outlet. The height 627 of the constricted section 612 and its distance 618 from the valve plate 501 may be selected to produce exhaust flow rates at the passage outlet ranging from a minimum to a maximum required wastegate flow rates. The range of exhaust flow rates at the passage outlet may vary depending on engine type, type of turbocharger, and a number of turbochargers mounted to the engine.

Valve arm 507 mounted on a back surface 522 of the valve plate 501, may be coupled to an actuation mechanism, shown in direction 530. The actuation mechanism may be adjusted to open the valve plate 501, thereby allowing exhaust flow to the exhaust catalyst downstream of the valve plate 501 via the passage outlet. The actuation mechanism may be controlled by various methods including hydraulic, mechanical or electrical, for example. An example showing the valve plate 501 in the open position is disclosed further below with reference to FIGS. 7A-7B.

Turning now to FIG. 6C, a schematic view showing a fourth embodiment 605 of a wastegate (e.g., wastegate valve) including a valve plate 501, valve arm 507 of an actuation mechanism and a wastegate passage 604 is disclosed. The valve plate 501, mounted to a downstream end 608 of the wastegate passage 604, may include a curved surface 513 forming a raised edge 505 and a side opening 506. The raised edge 505 includes a side wall 514, curved edge 516, and curved section 523 which tapers off into the side opening 506 of the valve plate 501. In this example, a length 622 of the raised edge 505 is shown to be longer compared to the raised edge disclosed in FIGS. 5A-6B. Also, the inner circular surface 512, surrounding the raised edge 505 and the side opening 506, has a smaller surface area compared to the inner circular surface disclosed in FIGS. 5A-6B.

As shown in FIG. 6C, the raised edge 505 is shown as a circular shape but other geometrical shapes may be utilized. Further, the valve plate 501 includes a circular portion 510 that connects the side wall 514 to a circular element 519 formed on a back surface 522 of the valve plate. When the wastegate is closed, the valve plate 501 may be axially mounted to a downstream end 608 of the wastegate passage, along a central port axis 603.

Exhaust flow from an engine enters the wastegate passage 604 via a main opening 614 at an upstream end 607 of the passage. When adjusted to a closed wastegate position, the raised edge 505 of the valve plate 501 may be disposed inside the main opening 614, at the downstream end 608 of the wastegate passage 604. In this closed wastegate position, the side wall 514 of the raised edge 505 does not touch a first interior wall 630 of the wastegate passage 604, and a side opening 506 formed on an opposite side 626 of the raised edge 505 faces a second internal wall 632 of the passage. The curved surface 513 on the valve plate 501 may guide exhaust flow along a direction 628, when the wastegate valve is adjusted to an open position. For example, the curved surface 513, may be curved between the side wall 514 in multiple directions, forming a multiplane curved surface that forms the side opening 506 and the raised edge 505. In one example, the curved surface 513, may curve towards the side opening 506, thereby directing exhaust flow along the direction 628.

A valve arm 507 having a flat surface 509 and a planar edge 511, may be coupled at first end 634 to the back surface 522 of the valve plate 501 while a second end 635 of the valve arm 507 may be connected to an actuation mechanism in direction 530. As an example, the actuation mechanism may be a mechanical, hydraulic or electrical actuator, which may be adjusted to open and close the valve plate during engine operation. During engine operation, the actuation mechanism may be adjusted to move the valve arm 507 to pivotably open the valve plate 501, and keep the valve plate open, thereby allowing exhaust flow to an exhaust catalyst placed downstream of the wastegate. When the wastegate is open, the side wall 514 and curved surface 513, which may be partially disposed inside the main opening, may guide exhaust flow via the side opening 506 to the exhaust catalyst.

In this way, the wastegate may direct exhaust flow directly through the wastegate passage to the exhaust catalyst, while minimizing exhaust energy losses due to exhaust flow impinging on passage walls. By more directly flowing the exhaust gas to the exhaust catalyst, exhaust energy may be efficiently used to warm up the catalyst, thereby expediting catalyst lightoff while reducing fuel emissions.

Turning to FIGS. 7A-7B, schematic views showing a third embodiment of the wastegate (e.g., wastegate valve) including a valve plate 501 in a partially open position, valve arm 507 of an actuation mechanism, and a wastegate passage 604 are depicted. FIG. 7A shows a first view 700 of the third embodiment of the wastegate valve in the partially open position. FIG. 7B shows a second view 702 of the third embodiment of the wastegate valve in the partially open position. The partially open position of the wastegate valve may be a position between a fully closed position and a fully open position. When in the fully closed position, there is no exhaust flow through a passage outlet 720, while the fully open position involves a maximal amount of opening, where a maximum amount of exhaust flow passes through the passage outlet 720 and downstream in a bypass passage. In each of the first and second views, the valve plate 501 is partially open to allow exhaust flow in a first direction, as shown by arrow 709. The wastegate passage 604 includes a circular inner edge 705, circular outer edge 706 and main opening 614.

When adjusted to partially open by the actuation mechanism placed at a direction 530, valve arm 507 may tilt the valve plate 501 to open outward in direction 716, such that an inner face 715 of the valve plate 501 may align along axis 712 to form a first tilt angle 710 between axis 712 and axis 714. When the wastegate moves from the closed to the partially open position (or towards the fully open position), the raised edge 505 on the valve plate 501 pivots within a lip surface 610 and the side opening 506 moves outward and away from the passage 604, for example. In another example, the valve plate 501 may be adjusted to open such that a first side 624 of the valve plate 501 hinges within the passage 604 at a first side 644 of the passage 604 that includes the constricted section 612 and a second side 625 of the valve plate 501 is spaced away from the passage at a second side 645 of the passage that does not include the constricted section. As an example, the first side 624 of the valve plate 501, may include the raised edge 505 while the second side 625 includes the side opening 506. In another example, a first internal wall 609 and the lip surface 610 of the wastegate passage 604 may form the first side 644 of the passage, while a second internal wall 611, may form the second side 645 of the passage. Further, the first side 624 of the valve plate 501 and the first side 644 of the wastegate passage may be aligned with one another (e.g., on a same side of the wastegate relative to central axis 603). Similarly, the second side 625 of the valve plate 501 and the second side 645 of the wastegate passage 604 may be aligned with one another (e.g., on a same side of the wastegate relative to the central axis 603).

The wastegate valve may be adjusted into the partially open position with the tilt angle 710 ranging from 5-12 degrees, for example. When the wastegate is adjusted to the partially open position, side wall 514 of the raised edge 505, may remain partially disposed inside a downstream end 608 of the main opening 614 to guide exhaust flow through the wastegate outlet 720. The exhaust flow from the engine (shown by flow direction 601) may continue to enter the main opening 614 via an upstream end 607 of the wastegate passage 604. The constricted section 612 formed at a junction between the first internal wall 609 and the lip surface 610 of the wastegate passage 604, may cause exhaust flow velocity to increase upstream of the valve plate 501 before the flow exists the side opening 506 along the first direction, as shown by arrow 709. An exhaust flow volume (e.g., amount of exhaust gases) exiting the wastegate outlet 720 may depend on a size of the tilt angle 710 of the wastegate valve. As the tilt angle 710 is increased, the volume of the exhaust gas exiting the wastegate outlet 720, and reaching the exhaust catalyst placed downstream of the wastegate valve may increase.

Turning to FIGS. 8A-8B, schematic views showing the third embodiment of a wastegate (e.g., wastegate valve) including valve plate 501 in a fully open position, a valve arm 507 of an actuation mechanism, and a wastegate passage 604 are depicted. FIG. 8A shows a first view 800 of the third embodiment of the wastegate valve in the fully open position. FIG. 8B shows a second view 802 of the third embodiment of the wastegate valve in the fully open position. In each of the first and second views, the valve plate 501 is fully open to allow exhaust flow in direction 709.

The wastegate passage 604 includes a first internal wall 609 formed upstream of a lip surface 610. In one example, the first internal wall 609 has a lip edge 613 formed at a constricted section 612 which tapers off to the lip surface 610 of the wastegate passage 604. As an example, the lip surface 610 may be formed downstream of the constricted section 612, the lip surface 610 having a first diameter 722 larger than a second diameter 724 of the constricted section 612. In another example, the first diameter 722 of the lip surface 610 may be the same as a third diameter 725 of the passage 604 upstream of the constricted section 612. In other examples, the constricted section 612 may extend around only a portion of the circumference of the passage 604, wherein the portion is aligned with a first side 624 of the valve plate 501. The first internal wall 609 and the lip surface 610 may define a first side 644 of the wastegate passage while a second internal wall 611 defines a second side 645 of the passage.

As shown in FIGS. 8A-8B, the valve arm 507 attached to a back surface 522 of the valve plate 501, may be adjusted by an actuator positioned in direction 530, to fully open the wastegate valve. For example, when the wastegate moves from the partially open position to the fully open position, the raised edge 505 on the valve plate 501 pivots within a lip surface 610 and a side opening 506 moves outward and away from the passage 604. In another example, the wastegate valve may be pivotably opened by tilting the valve plate 501 at a second tilt angle 806 formed between axes 712 and 714. In one example, the wastegate valve may remain pivotably open with the tilt angle 806 ranging from 12 to 25 degrees, allowing a large volume of exhaust flow through the wastegate outlet 720 along a first direction, as shown by arrow 709. In other examples, the valve plate 501 may include a curved surface (such as curved surface 513 in FIG. 7A) that forms the side opening 506, and may act in conjunction with the constricted section 612 on the passage 604 to guide exhaust flow via the wastegate outlet 720 to an exhaust catalyst placed downstream of the wastegate valve.

In this way, the curved surface forming the side opening 506 on the valve plate 501, may act in conjunction with the constricted section 612 on the wastegate passage 604, to guide the exhaust flow directly to the exhaust catalyst while reducing exhaust energy losses due to exhaust flow impinging on side walls of the passage. By guiding exhaust flow directly downstream to the exhaust catalyst, warmup duration of the catalyst may be reduced to expedite catalyst lightoff while minimizing fuel emissions.

Turning to FIGS. 9A-9B, schematic views showing the third embodiment of the wastegate (e.g., wastegate valve) including a valve plate 501 in a closed position, valve arm 507 attached to an actuation mechanism, and a wastegate passage 604 are depicted. FIG. 9A shows a first cross sectional view 900 of the third embodiment of the wastegate valve in the closed position. FIG. 9B shows a second cross sectional view 902 of the third embodiment of the wastegate valve in the closed position. In each of the first and second cross sectional views, the valve plate 501 is mounted to a downstream end 608 of the wastegate passage 604, and exhaust flow enters the passage via a main opening 614 at an upstream end 607 of the passage.

The wastegate passage 604 includes a first internal wall 609 and a lip surface 610 forming a first side 644 of the passage. The wastegate passage 604 also includes a second internal wall 611 that forms a second side 645 of the passage. The second internal wall 611 includes a front end 912 that may be in face sharing contact with an inner circular surface 512 of the valve plate 501. The first internal wall 609 includes a side edge 909 that defines a boundary between the first internal wall 609 and the second internal wall 611. The first internal wall 609 may be formed upstream of the lip surface 610, such that a constricted section 612 formed between the two walls, tapers off to the lip surface 610 along a lip edge 613. In one example, the lip surface 610 may be formed downstream of the constricted section 612, the lip surface 610 having a first diameter (such as diameter 722 in FIG. 8A) larger than a second diameter 920 of the constricted section 612. When the wastegate is closed, a raised edge 505 on the valve plate 501 may sit within the lip surface 610, for example. In other examples, the constricted section 612 may curve inward, toward central axis 603 of the passage 604, from a position upstream of the valve plate 501 to a position at the lip surface 610 and proximate to the valve plate 501.

The first internal wall 609 has a wall thickness 906 which may gradually increase in size, in a direction 601 of the exhaust flow inside the wastegate passage 604. As an example, the wall thickness 906 of the first internal wall 609 may have a first wall thickness at the upstream end 607, and a second wall thickness at the constricted section 612 of the wastegate passage 604, the second wall thickness larger than the first wall thickness. In one example, the wall thickness 906 of the first internal wall 609 may range from 4 mm-8 mm. In other examples, a sidewall 913 of the wastegate passage 604 may narrow towards the central axis 603 of the passage 604 at the constricted section 612, and the narrowing may increase as the sidewall 913 gets closer to the valve plate. In contrast, the second internal wall 611 may have a uniform wall thickness 907 throughout the length of the wastegate passage 604. As an example, the second internal wall 611 may have a wall thickness in a range of 4 mm-5 mm.

When valve plate 501 is closed, the raised edge 505 may be disposed inside the wastegate passage 604 with a curved edge 516 of the raised edge 505 forming a clearance gap 927 between the curved edge 516 and lip edge 613 upstream of the lip surface 610. As an example, the raised edge 505 may fit within the lip surface 610 when the wastegate is in a closed position. When the wastegate valve is adjusted to an open position, a curved surface 513 that forms a side opening 506, opposite to the raised edge 505, may guide exhaust flow to an exhaust catalyst. For example, the curved surface 513, may be curved between a side wall 514 in multiple directions, forming a multiplane curved surface that forms the side opening 506 and the raised edge 505. In one example, the curved surface 513, may act in conjunction with the constricted section 612 in the passage 604, to guide exhaust flow to the exhaust catalyst.

A front portion of the lip surface 610 may be in face sharing contact with an inner circular surface 512 of the wastegate valve, with the raised edge 505 forming an annular enclosure 917 between the lip edge 613, inner circular surface 512 and lip surface 610. The inner circular surface 512 of the valve plate 501, may abut against the front portion 912 of the wastegate passage 604 along contact interface 914. Similarly, an annular opening 908 may be formed between surfaces of the lip surface 610, inner circular surface 512 and side wall 514 of the raised edge 505, with a side edge 916 forming one of the enclosing walls.

The valve arm 507 may be attached to a central section 910 of the valve plate 501, while a downstream end 935 of the valve arm 507 may be coupled to an actuation mechanism in a direction 530. As example, the valve arm 507 may be adjusted using different types of actuators including mechanical, hydraulic and electrical actuators, to open and close the wastegate valve during engine operation. When adjusted to an open wastegate position, the raised edge 505 of the valve plate 501 may act in conjunction with the constricted section 612 on the wastegate passage 604, to guide exhaust flow to an exhaust catalyst downstream from the wastegate valve. In this way, the wastegate may improve exhaust flow efficiency by minimizing exhaust energy losses due to exhaust flow impinging on side walls of the wastegate passage, thereby reducing catalyst warmup duration while minimizing fuel emissions.

In one example, a wastegate, comprises: a valve plate including a multiplane curved surface on an interior of the valve plate, the curved surface forming a raised edge on a first side of the valve plate and a side opening on a second side of the valve plate; a passage including a constricted section positioned upstream of the valve plate and aligned with the raised edge, the valve plate positioned at an end of the passage. In the preceding example, additionally or optionally, the constricted section extends around only a portion of the circumference of the passage, wherein the portion is aligned with the first side of the valve plate. In any or all of the preceding examples, additionally or optionally, at the constricted section, an interior sidewall of the passage narrows towards a central axis of the passage and the narrowing increases as the interior sidewall gets closer to the valve plate. In any or all of the preceding examples, additionally or optionally, the passage includes a lip formed downstream of the constricted section, the lip having a larger diameter than the constricted section.

Furthermore, in any or all of the preceding examples, additionally or optionally, the diameter of the lip is the same as a diameter of the passage upstream of the constricted section. In any or all of the preceding examples, additionally or optionally, the constricted section curves inward, toward a central axis of the passage, from a position upstream of the valve plate to a position at the lip and proximate to the valve plate. In any or all of the preceding examples, additionally or optionally, when the valve plate is in a closed position, the raised edge fits within the lip. In any or all of the preceding examples, additionally or optionally, when the valve plate is in the closed position, the multiplane curved surface of the valve plate faces an interior of the passage and the side opening faces an interior sidewall of the passage.

In other preceding examples, additionally or optionally, when the valve plate is in an open position, the raised edge pivots within the lip and the side opening moves outward and away from the passage. In any or all of the preceding examples, additionally or optionally, the second side of the valve plate is opposite the first side of the valve plate relative to a common central axis of the passage and valve plate. In any or all of the preceding examples, additionally or optionally, the multiplane curved surface is concave. In any or all of the preceding examples, additionally or optionally, the constricted section is only on a single side of the first passage, relative to a central axis of the passage, and the single side is a same side as the first side of the valve plate. In any or all of the preceding examples, additionally or optionally, when the valve plate is in an open position, the first side of the valve plate hinges within the passage at a first side of the passage that includes the constricted section and the second side of the valve plate is spaced away from the passage at a second side of the passage that does not include the constricted section.

In another example, additionally or optionally, a wastegate, comprises: a valve plate including a multiplane curved surface formed on an interior base of the valve plate, the curved surface forming a raised edge on a first side of the valve plate and a side opening on a second side of the valve plate; a passage including a constricted section positioned upstream of the valve plate, on a first side of the passage, where the first side of the passage is aligned with the second side of the valve plate, the valve plate positioned at an end of the passage; and a valve actuator coupled to the valve plate and configured to pivot the valve plate at the first side of the passage to open the valve plate at a second side of the passage.

In further examples, additionally or optionally, the second side of the passage is opposite the first side of the passage relative to a central axis of the passage and wherein the constricted section is only positioned on the first side of the passage and not the second side of the passage. In any or all of the preceding examples, additionally or optionally, when the wastegate is in a closed position the base of the valve plate covers an opening at the end of the passage and an interior side of the base sits against the end of the passage. In any or all of the preceding examples, additionally or optionally, when the wastegate is in the closed position, the raised edge of the valve plate sits within a lip formed at the end of the passage, downstream of the constricted section, wherein the lip has a larger diameter than the constricted section.

In other examples, additionally or optionally, a system, comprises: a turbocharger including a bypass passage arranged around a turbine of the turbocharger; a catalyst positioned downstream of the turbine and the bypass passage; a wastegate positioned within the bypass passage, the wastegate comprising: a wastegate passage coupled within the bypass passage, the wastegate passage including a constricted section and a lip formed downstream of the constricted section, at an end of the wastegate passage; a valve plate positioned at the end of the wastegate passage, downstream of the lip, the valve plate including a multiplane curved surface on an interior of the valve plate, the curved surface forming a raised edge on a first side of the valve plate and a side opening on a second side of the valve plate, where the constricted section is aligned on a same side of the wastegate passage as the first side of the valve plate. In any or all of the preceding examples, additionally or optionally, a wastegate actuator coupled to an exterior side of the valve plate, the wastegate actuator having a vertically extended arm coupled to a swivel mechanism. In any or all of the preceding examples, additionally or optionally, a wastegate actuator coupled to an exterior side of the valve plate, the wastegate actuator having a vertically extended arm coupled to a swivel mechanism that rotates the wastegate to an open position resulting in airflow to bypass the turbine. In any or all of the preceding examples, additionally or optionally, the multiplane curved surface on the interior of the valve plate acts in conjunction with the constricted section of the wastegate passage to direct exhaust flow from the passage to an exhaust catalyst downstream of the valve plate.

Note that the example systems included herein can be used with various wastegate valve system configurations. It will be appreciated that the configurations disclosed herein are exemplary in nature, and that these specific embodiments are not to be considered in a limiting sense, because numerous variations are possible. For example, the above technology can be applied to various wastegate valve systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wastegate, comprising:
a valve plate including a multiplane curved surface on an interior of the valve plate, the curved surface forming a raised edge on a first side of the valve plate and a side opening on a second side of the valve plate; and
a passage including a constricted section positioned upstream of the valve plate and aligned with the raised edge, the valve plate positioned at an end of the passage;
wherein at the constricted section, an interior sidewall of the passage narrows towards a central axis of the passage and the narrowing increases as the interior sidewall gets closer to the valve plate.

2. The wastegate of claim 1, wherein the constricted section extends around only a portion of the circumference of the passage, wherein the portion is aligned with the first side of the valve plate.

3. The wastegate of claim 1, wherein the passage includes a lip formed downstream of the constricted section, the lip having a larger diameter than the constricted section.

4. The wastegate of claim 3, where the diameter of the lip is the same as a diameter of the passage upstream of the constricted section.

5. The wastegate of claim 3, wherein the constricted section curves inward, toward a central axis of the passage, from a position upstream of the valve plate to a position at the lip and proximate to the valve plate.

6. The wastegate of claim 3, wherein when the valve plate is in a closed position, the raised edge fits within the lip.

7. The wastegate of claim 6, wherein when the valve plate is in the closed position, the multiplane curved surface of the valve plate faces an interior of the passage and the side opening faces an interior sidewall of the passage.

8. The wastegate of claim 3, wherein when the valve plate is in an open position, the raised edge pivots within the lip and the side opening moves outward and away from the passage.

9. The wastegate of claim 1, wherein the second side of the valve plate is opposite the first side of the valve plate relative to a common central axis of the passage and valve plate.

10. The wastegate of claim 1, wherein the multiplane curved surface is concave.

11. The wastegate of claim 1, wherein the constricted section is only on a single side of the first passage, relative to a central axis of the passage, and the single side is a same side as the first side of the valve plate.

12. The wastegate of claim 1, wherein when the valve plate is in an open position, the first side of the valve plate hinges within the passage at a first side of the passage that includes the constricted section and the second side of the valve plate is spaced away from the passage at a second side of the passage that does not include the constricted section.

13. A wastegate, comprising:
a valve plate including a multiplane curved surface formed on an interior base of the valve plate, the curved surface forming a raised edge on a first side of the valve plate and a side opening on a second side of the valve plate;

a passage including a constricted section positioned upstream of the valve plate, on a first side of the passage, where the first side of the passage is aligned with the second side of the valve plate, the valve plate positioned at an end of the passage; and a valve actuator coupled to the valve plate and configured to pivot the valve plate at the first side of the passage to open the valve plate at a second side of the passage;

wherein at the constricted section, an interior sidewall of the passage narrows towards a central axis of the passage and the narrowing increases as the interior sidewall gets closer to the valve plate.

14. The wastegate of claim 13, wherein the second side of the passage is opposite the first side of the passage relative to a central axis of the passage and wherein the constricted section is only positioned on the first side of the passage and not the second side of the passage.

15. The wastegate of claim 13, wherein when the wastegate is in a closed position the base of the valve plate covers an opening at the end of the passage and an interior side of the base sits against the end of the passage.

16. The wastegate of claim 15, wherein when the wastegate is in the closed position, the raised edge of the valve plate sits within a lip formed at the end of the passage, downstream of the constricted section, wherein the lip has a larger diameter than the constricted section.

17. A system, comprising:
a turbocharger including a bypass passage arranged around a turbine of the turbocharger;
a catalyst positioned downstream of the turbine and the bypass passage; and
a wastegate positioned within the bypass passage, the wastegate comprising:
a wastegate passage coupled within the bypass passage, the wastegate passage including a constricted section and a lip formed downstream of the constricted section, at an end of the wastegate passage; and
a valve plate positioned at the end of the wastegate passage, downstream of the lip, the valve plate including a multiplane curved surface on an interior of the valve plate, the curved surface forming a raised edge on a first side of the valve plate and a side opening on a second side of the valve plate, where the constricted section is aligned on a same side of the wastegate passage as the first side of the valve plate;
wherein at the constricted section, an interior sidewall of the wastegate passage narrows towards a central axis of the wastegate passage and the narrowing increases as the interior sidewall gets closer to the valve plate.

18. The system of claim 17, further comprising a wastegate actuator coupled to an exterior side of the valve plate, the wastegate actuator having a vertically extended arm coupled to a swivel mechanism that rotates the wastegate to an open position resulting in airflow to bypass the turbine.

19. The system of claim 17, wherein the multiplane curved surface on the interior of the valve plate acts in conjunction with the constricted section of the wastegate passage to direct exhaust flow from the passage to an exhaust catalyst downstream of the valve plate.

* * * * *